United States Patent
Albrecht

[11] Patent Number: 5,848,813
[45] Date of Patent: Dec. 15, 1998

[54] THREADED PORT FOR FLUID FLOW CONNECTION

[76] Inventor: David E. Albrecht, 1383 Granary Rd., Blue Bell, Pa. 19422

[21] Appl. No.: 932,786

[22] Filed: Sep. 18, 1997

Related U.S. Application Data

[63] Continuation of Ser. No. 140,759, Oct. 21, 1993, abandoned.

[51] Int. Cl.[6] ................................................. E16L 15/00
[52] U.S. Cl. ..................... 285/332; 285/334.4; 285/390; 285/148.19
[58] Field of Search .............................. 285/92, 328, 332, 285/334, 334.1, 334.2, 355, 390, 330, 219, 334.4, 148.19

[56] References Cited

U.S. PATENT DOCUMENTS

| | | | |
|---|---|---|---|
| 951,704 | 3/1910 | Schmedt | 285/334.2 |
| 2,239,942 | 4/1941 | Stone al. | 285/334.4 X |
| 3,145,035 | 8/1964 | Hanback | 285/917 |
| 4,624,488 | 11/1986 | Furgerson | 285/355 X |
| 4,736,967 | 4/1988 | Mott et al. | 285/328 X |
| 4,822,080 | 4/1989 | Darish . | |
| 4,928,999 | 5/1990 | Landriault et al. | 285/334 X |
| 4,958,862 | 9/1990 | Cappelli et al. | 285/334 |
| 5,000,490 | 3/1991 | Albrecht . | |
| 5,029,906 | 7/1991 | Chelette | 285/334 X |

FOREIGN PATENT DOCUMENTS

| | | | |
|---|---|---|---|
| 0104720 | 4/1984 | European Pat. Off. | 285/390 |

OTHER PUBLICATIONS

Pp. 1&2 of Mar. 1987 MS 33656 entitled "Fitting End, Standard Dimensions For Flared Tube Connection and Gasket Seal".

Pp. 648–667 of publication entitled "Hydraulic Tube Fittings" dated Jun. 1974.

P. 704 of publication entitled "Flares for Tubing" dated 1975.

Four page brochure entitled "Fladapter".

Four page brochure entitled "Ada Conn".

*Primary Examiner*—Terry Lee Melius
*Assistant Examiner*—Heather Shackelford
*Attorney, Agent, or Firm*—John F. A. Earley; John F. A. Earley, III; Holding, Earley, Follmer & Frailey

[57] ABSTRACT

A fluid flow connection comprising a threaded port for use with a nominal 74° male conical tube fitting and pipe end connection is disclosed. The threaded port is made to have a truncated conical seal surface having an included angle that is slightly larger than the corresponding included angle of the seal surface of the male portion of the fluid flow connection.

3 Claims, 2 Drawing Sheets

| TUBE DASH SIZE | THREADS | A | B +.005 -.000 | C +.005 -.005 | D +.000 -.010 | E MINIMUM |
|---|---|---|---|---|---|---|
| -8 | 3/4-16UN | .391 +.004 -.004 | .657 | .750 | .625 | .357 |
| -10 | 7/8-14UN | .484 +.004 -.004 | .770 | .875 | .750 | .469 |
| -12 | 1-1/16-12UN | .609 +.005 -.005 | .941 | 1.062 | .875 | .545 |
| -16 | 1-5/16-12UN | .844 +.007 -.005 | 1.191 | 1.312 | .875 | .545 |
| -20 | 1-5/8-12UN | 1.078 +.008 -.005 | 1.504 | 1.625 | .937 | .555 |
| -24 | 1-7/8-12UN | 1.312 +.008 -.005 | 1.753 | 1.875 | 1.062 | .699 |
| -32 | 2-1/2-12UN | 1.781 +.010 -.005 | 2.378 | 2.500 | 1.312 | .836 |

THREADED PORT FOR FLUID FLOW CONNECTION

This is a continuation of application(s) Ser. No. 08/140,759 filed on Oct. 21, 1993 now abandoned.

BACKGROUND

Fluid flow ports are the female portion of a fluid flow connection and are generally of two types, i.e. a flange port or a threaded port. This invention relates generally to an improvement over the prior art ports of the threaded type, and, more particularly, to fluid flow threaded ports for nominal 74° male conical tube fittings and pipe end connections.

Threaded ports were originally sized to connect pipes together or to connect pipe to a fluid flow component. "American National Standard Tapered Pipe Threads" (NPT) are one of the older connection methods employed, and are still widely used to both connect the parts and seal the fluid medium within the piping system. Refinements in these tapered pipe connecting systems have been made to help eliminate the helical leak path that was inherent in the original pipe thread standard. These newer refined tapered thread forms are best known as "American National Standard Dryseal Pipe Threads" (NPTF) threads.

Numerous other threaded port standards have been developed to improve the integrity of the threaded connection. A few of the more common ones employed in the United States include the SAE J514 Straight Thread O-Ring Boss Port and the Military Standards MS33650 and MS33649. Similar threaded ports are used around the world that employ metric or British Whitworth threads.

Tubing is also employed as a flow conduit in fluid flow systems. Possibly one to the oldest methods of connecting and sealing tubing requires one to flare the tube end. This flared end is then abutted against a corresponding male portion to effect a seal. Various tube flaring included angles have been employed in the United States and around the world for this purpose. One that has gained great acceptance is one that employs a nominal 74° included angle. This construction is documented in various standards such as SAE J514 and Military Standard MS 33656. This method of connection employs a fitting that has a male thread with the specified conical male nose of 73° to 75° to seal with the flared tube that has the female conical flare of 73° and 75°. (The 73°–75° range is based on the required tolerance of 74°±1°). A flaring standard that illustrates the proper flaring for tubing for this connection is shown in SAE J533b. A swivel nut with an internal female thread is employed to make a union connection. (It is noted that this prior tube fitting requires a different adaptive male thread form to properly connect this to a threaded port, and that these adapters can be eliminated by employing the teachings of this invention).

SUMMARY OF THE INVENTION

The present invention teaches one the efficacy of a fluid flow threaded port that can be used with the standard 37° (i.e., 74° included angle) male tube fitting to form a superior connection for higher pressures. It also teaches one how this modified form can be employed for lower pressure systems with higher flow capabilities as well as for difficult-to-seal media. It should also be noted that the metal to metal loaded sealing surface makes the fluid flow connectors pursuant to the invention ideal for both high and low temperature applications.

Briefly stated, the fluid flow fitting in accordance with the invention comprises a female portion including an internally threaded female engaging portion, a flow passage having a smaller diameter than said female engaging portions, and a truncated conical seal surface located between the threaded female engaging portion and the flow passage. The connection also comprises a male portion adapted to engage and mate in sealing contact with the female portion. The male portion includes an externally threaded male end portion adapted to be threadedly engaged with the internally threaded female engaging portion of the female portion, a flow passage adapted to communicate with the flow passage of the female portion, and a truncated conical seal surface constructed and arranged to be positioned in sealing contact with the seal surface of the female portion by the threaded engagement between the threaded portions of the male and female portions. The truncated conical seal surface of the female portion is constructed to have an included angle slightly larger than the included angle of the truncated conical seal surface of the male portion to ensure that said seal surface of said male portion seats on an inner diameter of the seal surface of the female portion so that fluid sealing takes place at a minimum diameter of said mating seal surfaces.

DETAILED DESCRIPTION OF THE INVENTION

Figures 1, 2:
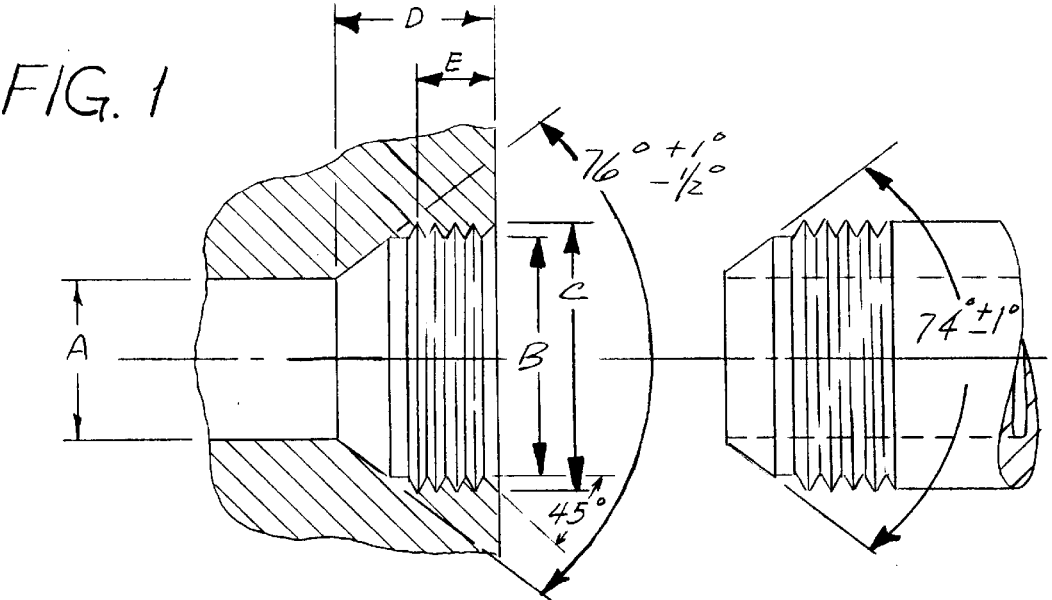
FIG. 1 is a sectional view of a threaded port in accordance with this invention provided in a manifold, for example, and showing the essential dimensions of the port at A to E and an associated standard connector having a nominal 74° included angle.
FIG. 2 is a table showing the value in inches of the design dimensions indicated at A to E of FIG. 1 for a series of seven sizes of a threaded port in accordance with the invention.

Initial reference is made to FIGS. 1 and 2 which show the construction and dimensions of a series of threaded ports made in accordance with the invention. In the table of FIG. 2, the lefthand column designated "TUBE DASH SIZE" refers to the nominal tube outer diameter in 1/16 of an inch, i.e. –8 being 8/16 or 1/2 inches, –12 being 12/16 or 3/4 inches, –16 being 16/16 or 1 inch, etc. The column designated "THREADS" refers to the size, pitch, and class of the threads, with, for example, "3/4–16 UN" referring to a 3/4 inch thread having 16 threads per inch of the standard unified thread type. The class of thread fit is optional based on the class of service and the connection quality required for a specific application. In FIG. 2, the dimensions A to E are all in inches. The "A" dimension is the through bore diameter of the port. The "B" dimension is the initial bore diameter that would receive the female thread. The "C" dimension is the 45° chamfer diameter. The "D" dimension is the depth of the counterbored portion including the truncated conical portion having the 76° included angle, as shown in FIG. 1, that receives the male nose portion of the connection (shown in the righthand side of FIG. 1). The "E" dimension is the depth of the thread. As indicated in FIG. 1, the included angle of the truncated conical portion that forms the seal surface of the threaded port of the invention is made to a tolerance of 76° plus 1° minus ½°. This included angle size is important because it ensures that the seal surface of the female portion of the connection will always be slightly larger (at least ½°) than the corresponding seal surface of the male portion of the connection which, as shown in FIG. 1, has a standard 74°±1° included angle. This causes the conical seal surfaces of the male and female portions to mate and seal at a minimum diameter.

By reason of this novel construction pursuant to the invention, the following advantages result:

1. The sealing takes place at the smallest diameter of the male conical seal surface and the connecting surfaces.
2. The tightening torque being applied to the smallest uniform connection area insures a consistent and effectively sealed metal to metal joint without over-tightening.
3. The fluid forces are contained closest to the inner flow diameter of the port connection thereby resulting in the maximum pressure capability for each size connection.
4. The similar and virtually contiguous bore sizes of both the fitting and the threaded port minimizes flow pressure losses.

When one compares this to a "standard 37°" flared tube fitting connection (which has an included angle of 74°±1°), one quickly realizes the efficacy of this invention. In the standard prior art flared fitting connection, the conical seal surfaces of the male fitting and flared tubing threaded port are both made to be within a 73° to 75° included angle. Because both parts have similar angular tolerances (i.e., 74°±1°), one cannot be assured as to where, i.e. at what diameter, these two conical seal surfaces will mate and seal. This, therefore, results in significant variations in the tightening torque required to effect a good sealed joint. It also results in variations in the areas under fluid loading that affects the maximum pressure capacity of the connection.

Figure 3:
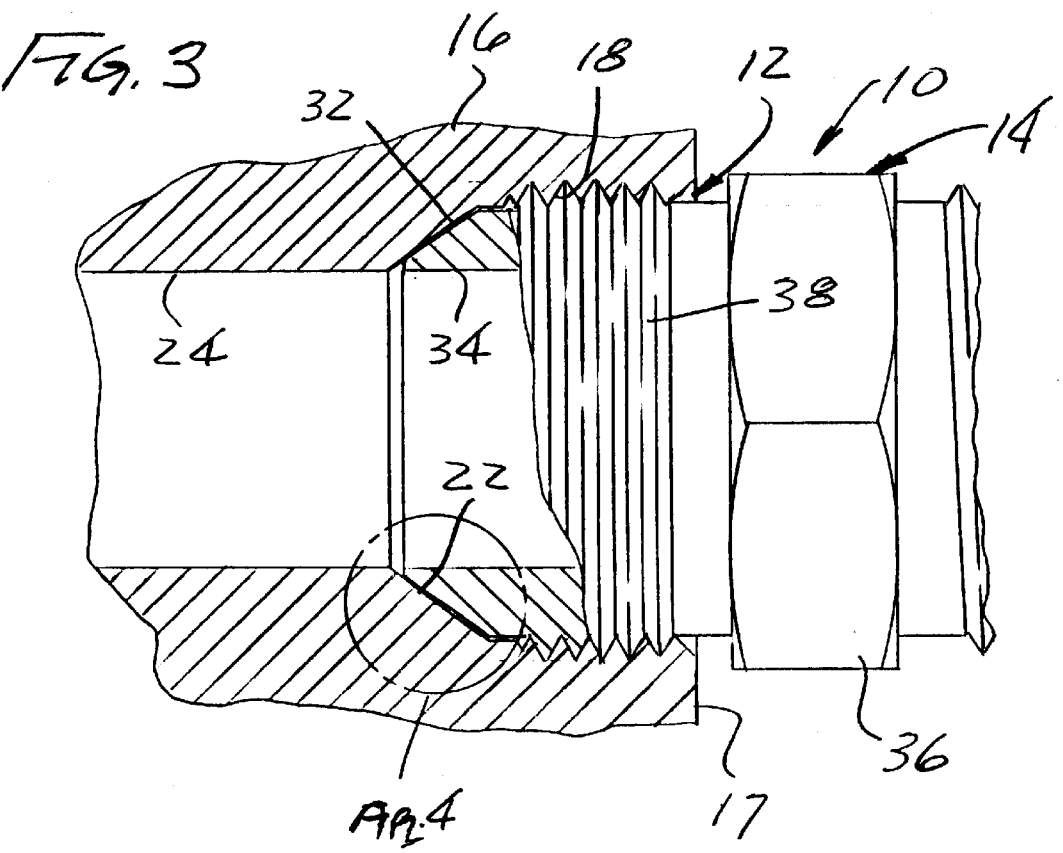
FIG. 3 is a sectional view of a fluid flow connection embodying the threaded port design in accordance with the invention and a standard connector as the male portion.

Referring to FIGS. 3 and 4, there is shown a fluid connection in accordance with the invention wherein a threaded port is constructed pursuant to the above-described dimensions and the male fitting is a standard 37° male connector. Thus, a fluid flow connection in accordance with the invention is generally indicated at 10 and comprises a female portion including a threaded port 12 and a male portion including a standard connector 14. The female portion 12 of connection 10 includes a port body 16 having a threaded bore 18 extending inwardly from an end face 17 to form an internally threaded female engaging portion 18. The port body 16 also has provided therein a flow passage 24, which is smaller in diameter than that of female engaging portion 18, and a truncated conical seal surface 22 located between threaded portion 18 and flow passage 24.

The standard connector that 14 forms the male portion of fluid flow connection 10 is adapted to engage and mate in sealing contact with the threaded port 12 that forms female portion of connection 10. Connector 14 includes a hexagonal nut portion 36 and an externally threaded male end portion 38 adapted to be threadedly engaged with the internally threaded female engaging portion 18. Connector 14 also has a cylindrical internal flow passage 34 adapted to communicate with the flow passage 24 in the assembled condition of connection 10. The nose end of connector 14 has a standard truncated conical seal surface 32 constructed and arranged to be positioned in sealing contact with seal surface 22 of the female portion by the threaded engagement between threaded portions 18 and 38.

In accordance with the novel feature of the invention, the truncated conical seal surface 22 of the female portion of connection 10 is constructed to have an included angle "F" slightly larger than the included angle "M" of the truncated conical seal surface 32 of the male portion of connection 10. This construction ensures that the seal surface 32 of the male portion seats on an inner diameter of the seal surface 22 of the female portion so that fluid sealing takes place at a minimum diameter of said seal surfaces 22 and 32. More specifically, the truncated conical seal surface 22 of the female portion of connection 10 is constructed to have an included angle "F" of 76° plus 1° minus ½°, whereas the standard truncated conical seal surface 32 of the connector of the male portion of connection 10 is constructed to have the standard 74°±1° included angle "M".

Figure 4A:
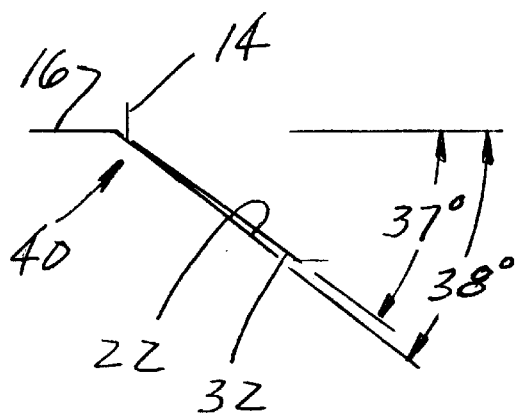
FIGS. 4A and 4B are views illustrating the angle and contact location of the seal surfaces in the region indicated by the encircled area 4 in FIG. 3 at two stages of the assembly of the connection.
Figure 4B:
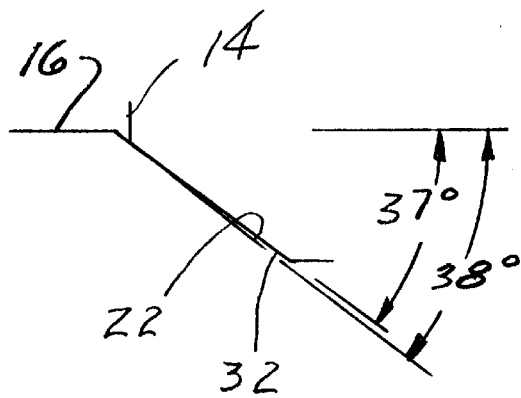

This novel sealing arrangement in accordance with the invention is illustrated in detail in FIGS. 4A and 4B. In FIGS. 4A, the parts are shown in the condition wherein the seal surfaces 22 and 32 make initial contact during an assembly of the connection 10. As shown in these figures, what occurs is that the contact is made along a circumferential line extending around the seal surfaces 22 and 32 at an inner diameter location indicated at 40. FIGS. 4B illustrates what occurs in a typical connection 10 wherein the parts have been tightened or "torqued" to achieve a leakproof seal, which tightening causes some deformation at the contacting seal surfaces 22 and 32. The torquing causes the sealing contact lines to mate together to provide a widened area of circumferential contact as illustrated in FIG. 4B to thereby improve the sealing action. It will be apparent that the nature and extent of the deformation will depend upon the type of materials employed in the connection 10 and on the amount of torquing that is employed. FIGS. 4A and 4B are intended to be illustrative only of one typical condition that could occur by the use of a fluid connection 10 in accordance with the invention.

In hydraulic systems, the SAE J518 Code 62 four bolt flange connections are rated for maximum pressures up to 6000 PSI in all sizes from −08 to −32 inclusive. These and similar flange systems are considered the preferred high pressure flange port connections in most places around the world. Therefore, development and testing were conducted to determine if the threaded ports of this invention could match the maximum pressure limits of these preferred 6000 PSI flange port connections. Threaded couplings were made that incorporated the threaded ports of this invention in each size from 08 to 32. The outside diameter and overall lengths of these test couplings are set forth, in inches, in the following table, which lists the "PIPE SIZE" comparable to corresponding "COUPLING SIZE", and which sets forth a corresponding tapered pipe coupling (at both 3000 PSI and 6000 PSI) for each test coupling.

| CPLG SIZE | PIPE SIZE COMP. | O.D. × LENGTH OF TEST CPLG. | CORRES. TAPERED 3000 PSI RATED | PIPE CPLG. 6000 PSI RATED |
|---|---|---|---|---|
| −8 | | 1 ⅛ × 1 ½ | | |
| −10 | ½ | 1 ⅛ × 1 ¾ | 1 ⅛ × 1 ⅞ | 1 ½ × 1 ⅞ |
| −12 | ¾ | 1 ⅜ × 2 | 1 ⅜ × 2 | 1 ¾ × 2 |
| −16 | 1 | 1 ⅝ × 2 | 1 ¾ × 2 ⅜ | 2 ¼ × 2 ⅜ |
| −20 | 1 ¼ | 2 × 2 ¼ | 2 ¼ × 2 ⅝ | 2 ½ × 2 ⅝ |
| −24 | 1 ½ | 2 ¼ × 2 ½ | 2 ½ × 3 ⅛ | 3 × 3 ⅛ |
| −32 | 2 | 3 × 3 | 3 × 3 ⅜ | 3 ⅝ × 3 ⅜ |

It is noted that the test coupling envelope is the same size or smaller than a corresponding tapered pipe steel coupling that is rated for 3000 PSI and that it is substantially smaller than the corresponding 6000 PSI rated tapered pipe steel coupling.

In the construction of the test fluid flow connections, adapters were supplied by ADACONN(™) of Blue Bell, Pa. These adapters were made to adapt an SAE J518 Code 62 flange to a nominal 74° conical male fitting in accordance with the teachings of my U.S. Pat. No. 5,000,488. Each size SAE J518 Code 62 flange was connected to both sides of the corresponding size coupling with its threaded ports made in accordance with this invention. Each was hydrostatically tested to 24,000 PSI, which is four times the flange's pressure rating. In all cases, there was no adverse effect on any of the adapters or the couplings that employed the threaded ports of this invention. This confirmed the efficacy of this invention and its use with SAE J518 Code 62 flange connections in systems up to 6000 PSI.

It should be noted that a leakproof seal in accordance with this invention depends on the local deformation of one member of the connection to conform to the minor surface irregularities of the other. Therefore, the surface conditions on both mating parts must be in good condition and this is particularly true whenever light gases are to be sealed. Metallic crush washers made from a malleable metal can be provided for placing between the two mating seal surfaces. These are made to yield and flow into any imperfections to insure a seal even with imperfect surfaces. These crush washers are available in Aluminum, Copper, Nickel, and Stainless Steel to allow the user to select the best material for the application based on the fluid being transmitted, the parent metals being connected, and the temperature spectrum of the application.

This invention provides a threaded port connection that can meet the same pressure ratings as the SAE Code 62 flange connection. It will be apparent to those skilled in the art that this invention permits one to make effective mechanically threaded components and piped systems thereby offering one possibility of eliminating all the hassle associated with a welded piping system.

One knowledgeable in the art of mechanically piped fluid flow systems will quickly recognize the advantage that this invention also contributes to lower pressure mechanically piped systems. The male threaded end that was used in the qualification testing for 6000 PSI was the threaded end employed on 37° tube fittings without a thread undercut thus providing maximum strength (Military Standard MS 33656 Style G). One knowledgeable in the art will recognize that the bore of this fitting can be increased in diameter while maintaining the 37° seal surface and the small frontal flat to eliminate a sharp cutting edge. When this is done to the fitting, and the threaded port bore is increased accordingly, it permits one to increase the flow area and flow rating of the conduit, at the expense of reducing the maximum pressure capability. Conversely, the bores can be decreased accordingly to reduce the flow area and increase the maximum pressure capability. Both of these examples assume that the outside diameter of the fitting and the threaded port are maintained and similar materials are utilized.

One of the teachings of this invention is to show one how to more effectively connect pipe by employing the standard 74° included angle male conical threaded pipe ends connected to threaded ports in accordance with this invention. The following table lists some of the standard pipe sizes together with the standard tube fitting thread and pipe bore sizes (in inches) that can be used with pipe and couplings that are threaded and bored for this improved connection.

| Pipe Size | Nominal Pipe O.D. | Pipe Sched. | Nominal Pipe Wall Thickness | Nominal Cplg. & Pipe I.D. | Comparable Conical Tube End Profile | UN Thread Size |
|---|---|---|---|---|---|---|
| ½ | .840 | 160 | .188 | .464 | 08 | ⅞ –14 |
| ¾ | 1.050 | 160 | .219 | .612 | 12 | 1 1/16–12 |
| 1 | 1.315 | 160 | .250 | .815 | 16 | 1 5/16–12 |
| 1 ¼ | 1.660 | 160 | .250 | 1.160 | 20 | 1 ⅝ –12 |
| 1 ½ | 1.900 | 160 | .281 | 1.338 | 24 | 1 ⅞ –12 |
| 3 | 3.500 | 160 | .438 | 2.624 | 48 | 3 ½ –12 |

A review of this data and the benefits that this invention teaches would also suggest to those knowledgeable in the art that the dash tube sizes of 7, 30, and 38 could also be developed at this time with 11/16–16UN, 2–⅜–12UN, and 2–⅞"–12UN threads so that the benefits that are taught in this invention could also be employed on ⅜", 2", and 2 ½" size pipe respectively. When this is accomplished, those knowledgeable in the art will also recognize that they can then easily employ the teachings of this invention on all pipe up to the 3" size.

Further, it will be apparent to those skilled in the art that they can also achieve these significant improvements in their piping systems by changing from tapered pipe thread to straight pipe threads with the conical nose in a straight thread pipe port made in accordance with the teaching of this invention. Furthermore, this could possibly be a simpler conversion for those who are more versed in pipe threading versus tube fabrication for fluid flow systems. Only the market can decide if we will have to develop threaded ports for threaded pipe ends in accordance with the teaching of this invention.

Another advantage of this invention is that one can now use a connector with ports sized at the smaller connector size to connect two SAE J518 flange ported components of different sizes and even different SAE Codes, i.e. Code 61 (3000 PSI) and Code 62 (6000 PSI). One knowledgeable in the art will readily recognize the many advantages of this invention when applied in this manner. Some of these include the compactness of this arrangement, the weight reduction, elimination of welded assemblies, optimizing component pressure ratings for this application for best value, etc.

One knowledgeable in the art will readily recognize the advantage of this invention in that the same fitting sized envelope can be utilized for various flow rates with a corresponding pressure limits by applying the teaching of this invention, i.e. the larger the bore, the higher the flow rating with a decrease in pressure rating. Conversely, the smaller the bore, the lower the flow rating with a higher pressure rating. Also, it will be apparent that the largest port and bore limits the fittings flow and pressure rating. This is a significant improvement in size and economy when compared to the requirements of the prior art's "tee" and "cross" fittings where fluid pressure was contained closer to the thread outside diameter, which resulted in significantly larger envelope components with increased pressure ratings.

One knowledgeable in this art will also recognize that similar size reductions and economies are made possible when the ports of this invention are employed in various fluid flow components (including tee's, crosses, elbows, etc.), headers, and manifolds.

It will be apparent that various changes may be made in the construction and arrangement of parts without departing from the scope of the invention as defined by the following claims.

What is claimed is:

1. A fluid flow connection comprising
a female portion including an internally threaded engaging portion,
a flow passage, and
a truncated conical seal surface on the female portion and located between said threaded engaging portion and said flow passage, and
said truncated conical seal surface on the female portion having an inner smaller end and a larger outer end,
a male portion adapted to engage and mate in sealing contact with said female portion including
an externally threaded male end portion adapted to threadedly engage said internally threaded engaging portion of said female portion,
a flow passage adapted to communicate with said flow passage of said female portion, and
a truncated conical surface on the male portion and constructed and arranged to be positioned in contact with said seal surface of said female portion by threaded engagement between said threaded male end portion of said male portion and said threaded engaging portion of said female portion,
said truncated conical surface on the male portion having a circular end edge, and means for ensuring that said circular end edge of said male portion seats on an inner diameter location of said seal surface of said female portion so that fluid sealing takes place at a minimum diameter of said mating seal surfaces,
said ensuring means including said truncated conical seal surface of said female portion being constructed to have an included angle which is always slightly larger than the included angle of said truncated conical surface of said male portion to ensure that said circular end edge of said male portion seats on the inner diameter location of said seal surface of said female portion so that fluid sealing takes place at the minimum diameter of said mating seal surfaces,
said included angle of said truncated conical surface of said male portion being made in accordance with the standard 74° angle with ±1° tolerance, and said included angle of said truncated conical seal surface of said female portion being made at a 76° angle within a tolerance of plus 1° minus ½
said sealing taking place at a circular sealing line between said end edge of said truncated conical surface of said male portion and the truncated conical seal surface of said female portion which forms a seal only at the minimum diameter of said mating seal surfaces,
said end edge of said conical surface of the male portion being larger than the smaller end of the seal surface of the female portion.

2. A threaded port of a fixed, solid port construction for use in a fluid flow connection having a standard male portion adapted to engage and mate in sealing contact with the threaded port and including an externally threaded male end portion adapted to threadedly engage a corresponding internally threaded engaging portion of the threaded port and having a truncated conical surface with a circular seal end edge constructed and arranged to be positioned in sealing contact with a corresponding seal surface of the threaded part by reason of the threaded engagement between the corresponding portions of the male portion and the threaded port,
said threaded port comprising
a solid port body having an end face,
an internally threaded engaging portion in said port body extending inwardly from said end face,
a flow passage in said port body located inwardly of said threaded engaging portion, and
a truncated conical seal surface located in said port body between said threaded engaging portion and said flow passage and constructed and arranged to be positioned in sealing contact with the seal end edge of the male portion by the threaded engagement between said threaded engaging portion in said port body and a corresponding externally threaded portion of said male portion so that fluid sealing takes place at a minimum diameter of said mating seal surfaces;
said truncated conical seal surface on the port body having an inner smaller end and an outer larger end,
said included angle of said truncated conical surface of said male portion being made in accordance with the standard 74°±1° tolerance, and said truncated conical seal surface of said threaded port being made with a 76° angle within a tolerance of 76° plus 1° minus ½°,
said truncated conical seal surface on said male portion having a circular end edge,
said sealing taking place at a circular sealing line between said end edge of said truncated conical surface of said male portion and the truncated conical seal surface of said threaded port which forms a seal only at the minimum diameter of said mating seal surfaces,
said end edge of said conical surface of the male portion being larger than the smaller end of the seal surface of the threaded port.

3. For use in a plurality of fluid flow connections each of which has a male portion adapted to engage and mate in sealing contact with a corresponding female portion, each of said male portions including an externally threaded male end portion and a truncated conical surface with a circular seal end edge,
a plurality of female threaded port means each of which is adapted to mate in sealing contact with one of said male portions of a corresponding size,
each female threaded port means including
an internally threaded engaging portion,
a flow passage, and
a truncated conical seal surface located between said threaded engaging portion and said flow passage and constructed and arranged to be positioned in sealing contact with the seal end edge of a corresponding male portion of the connection by the threaded engagement between said threaded engaging portion of said female portion and a corresponding externally threaded portion of said male portion, and
means for ensuring that said seal surfaces seat together at an inner diameter location so that fluid sealing takes place at a minimum diameter of the mating seal surfaces,
said ensuring means including said truncated conical seal surface of said female threaded port being constructed to have an included angle which is always larger than the included angle of the truncated conical seal surface of the corresponding male portion to ensure that said seal surfaces seat together at the inner diameter location so that fluid sealing takes place only at the minimum diameter of said mating seal surfaces,
said included angle of said truncated conical seal surface of said male portion being made in accordance with the standard 74° angle with ±1° tolerance, and said truncated conical seal surface of said female portion being made at a 76° angle within a tolerance of plus 1° minus ½°.

* * * * *